Figure 1:
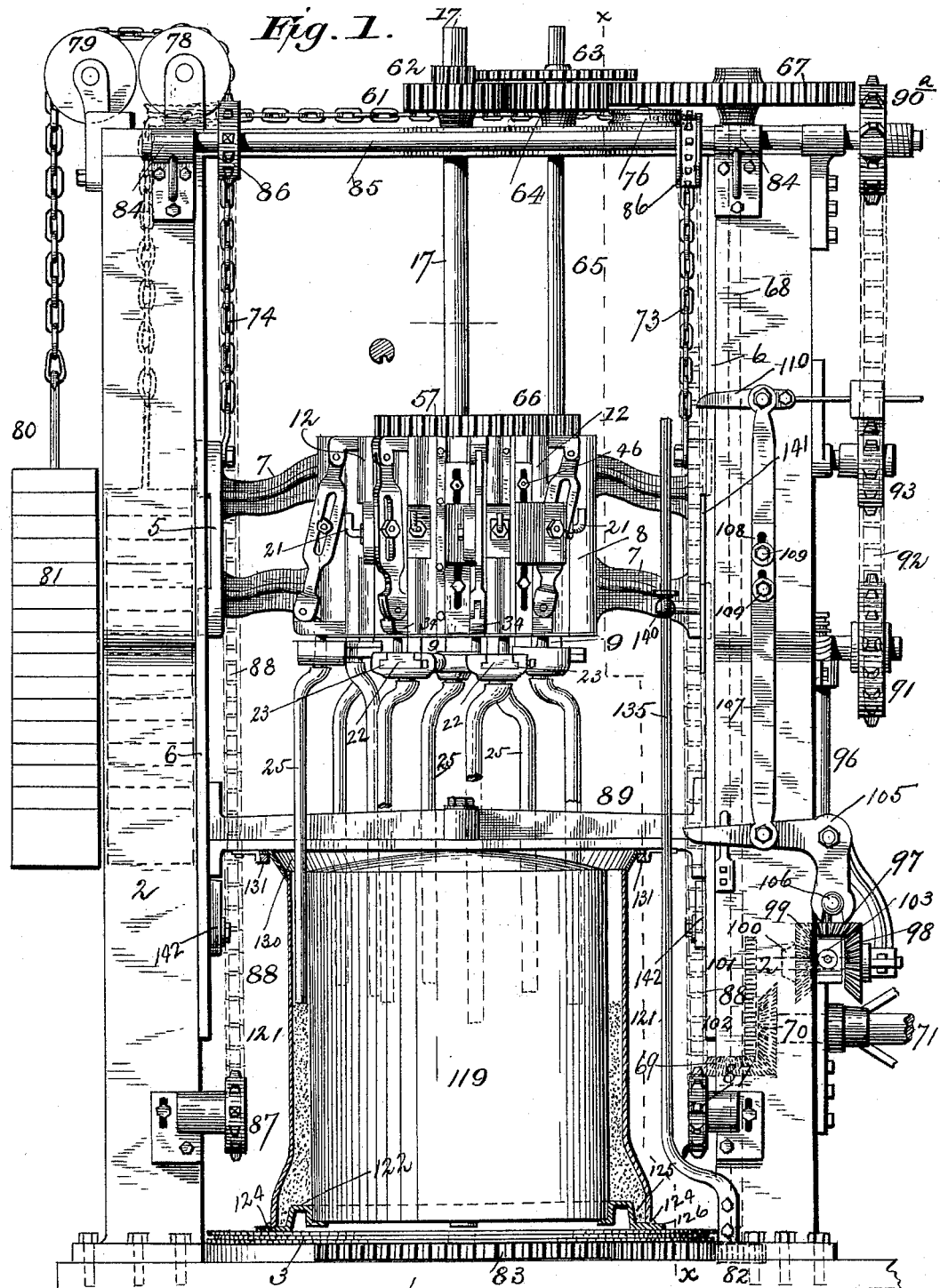

(No Model.) 9 Sheets—Sheet 1.

W. D. SHERMAN.
SEWER PIPE MACHINE.

No. 462,087. Patented Oct. 27, 1891.

Witnesses:
F. L. Ourand
Wm. L. Coombs

Inventor:
Willis D. Sherman,
by Paul Paggert & Co.
Attorneys.

(No Model.) 9 Sheets—Sheet 2.

W. D. SHERMAN.
SEWER PIPE MACHINE.

No. 462,087. Patented Oct. 27, 1891.

WITNESSES: F. L. Ourand. W. D. Coombs.

INVENTOR: Willis D. Sherman, by Sams Bagger & Co., Attorneys (No Model.)  
9 Sheets—Sheet 4.

W. D. SHERMAN.
SEWER PIPE MACHINE.

No. 462,087. Patented Oct. 27, 1891.

WITNESSES:  
F. L. Ourand.  
Jo. L. Coombs.

INVENTOR:  
Willis D. Sherman  
by Davis Bugger & Co,  
Attorneys.

THE NORRIS PETERS CO., PHOTO-LITHO., WASHINGTON, D. C.

(No Model.) 9 Sheets—Sheet 5.

W. D. SHERMAN.
SEWER PIPE MACHINE.

No. 462,087. Patented Oct. 27, 1891.

WITNESSES: F. L. Ourand, J. L. Coombs

INVENTOR: Willis D. Sherman, by Davis Dagger & Co., Attorneys.

(No Model.) 9 Sheets—Sheet 6.
W. D. SHERMAN.
SEWER PIPE MACHINE.
No. 462,087. Patented Oct. 27, 1891.
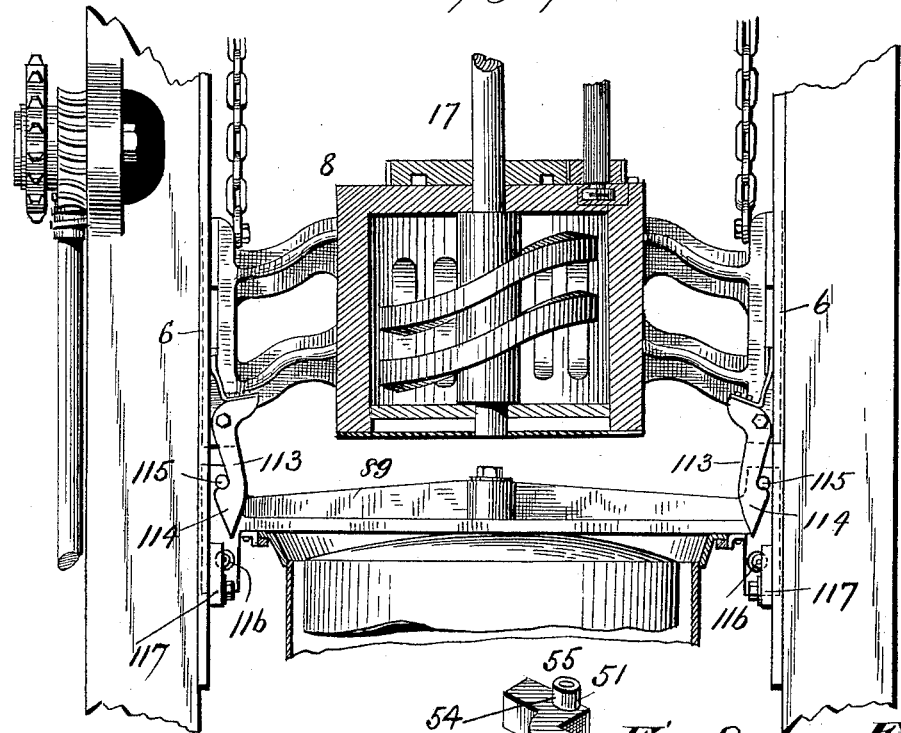
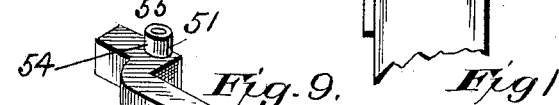
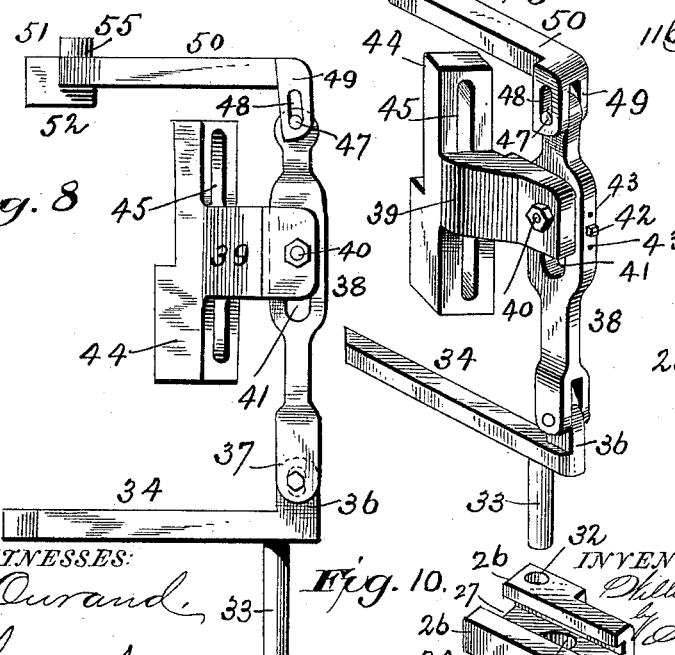
WITNESSES: F. L. Durand, W. L. Coombs
INVENTOR: Willis D. Sherman, by Davis Bagger & Co., Attorneys
THE NORRIS PETERS CO., PHOTO-LITHO., WASHINGTON, D. C.

(No Model.)  9 Sheets—Sheet 7.
W. D. SHERMAN.
SEWER PIPE MACHINE.
No. 462,087. Patented Oct. 27, 1891.
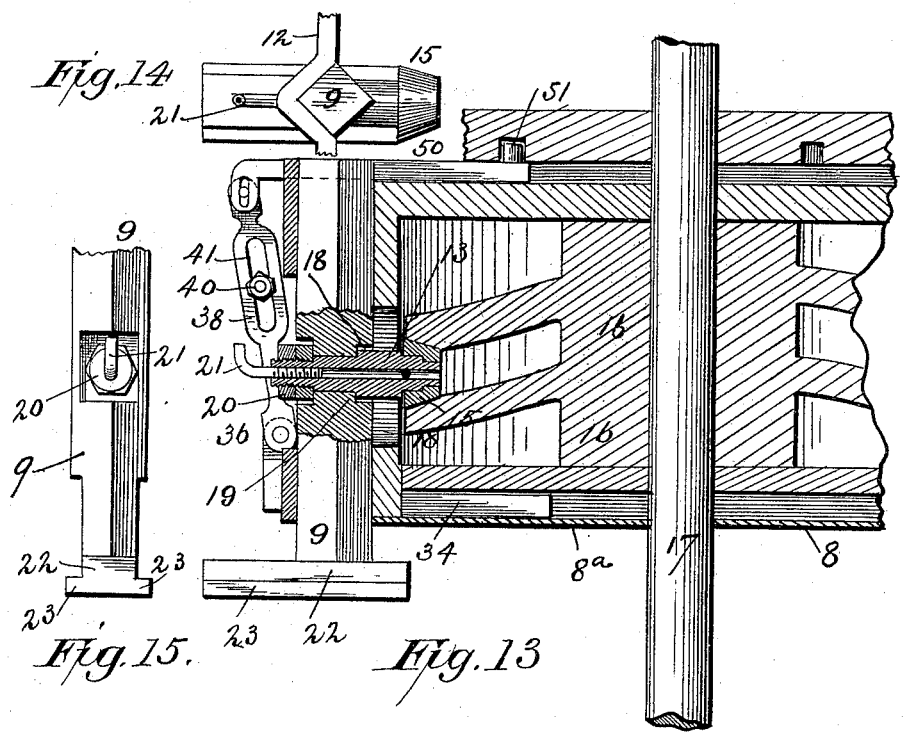
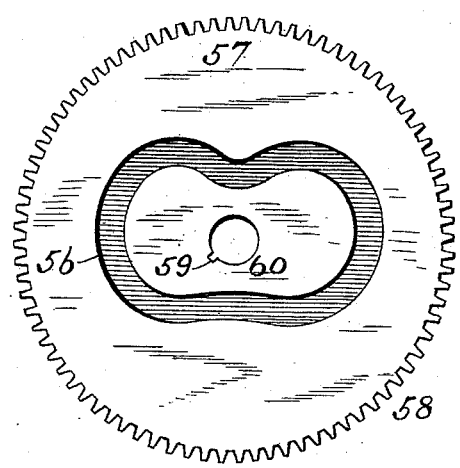
Fig. 16.
WITNESSES:
INVENTOR:
Attorneys (No Model.) 9 Sheets—Sheet 8.

W. D. SHERMAN.
SEWER PIPE MACHINE.

No. 462,087. Patented Oct. 27, 1891.

WITNESSES: F. L. Ourand, H. L. Coombs

INVENTOR: Willis D. Sherman, by Louis Bagger & Co. Attorneys

THE NORRIS PETERS CO., PHOTO-LITHO., WASHINGTON, D. C.

(No Model.) 9 Sheets—Sheet 9.
W. D. SHERMAN.
SEWER PIPE MACHINE.
No. 462,087. Patented Oct. 27, 1891.
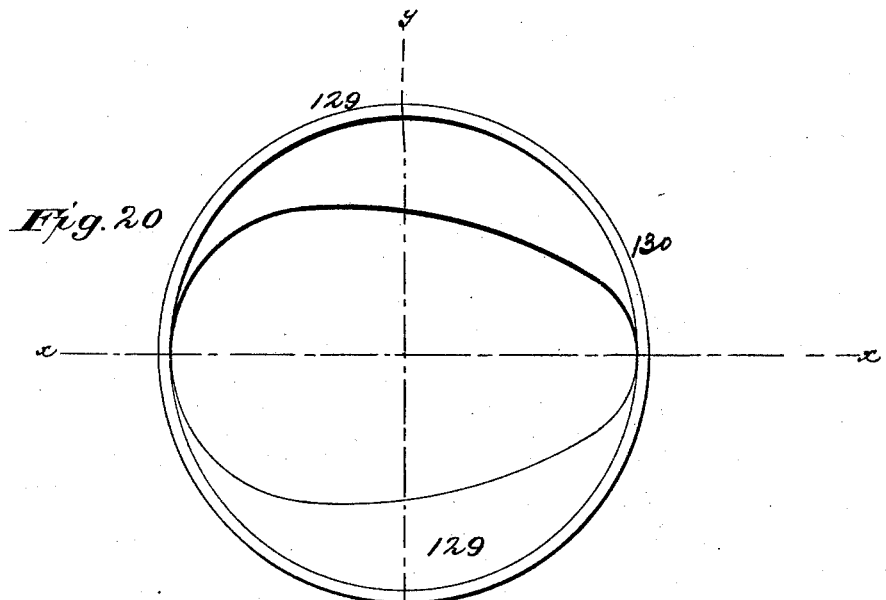
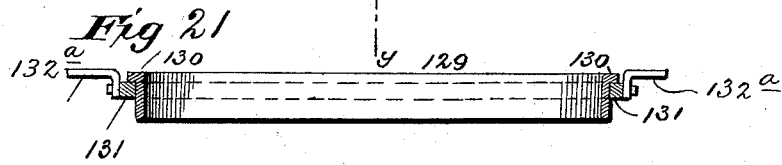
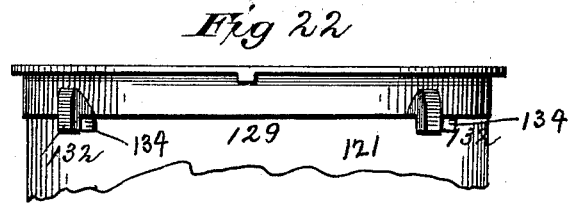
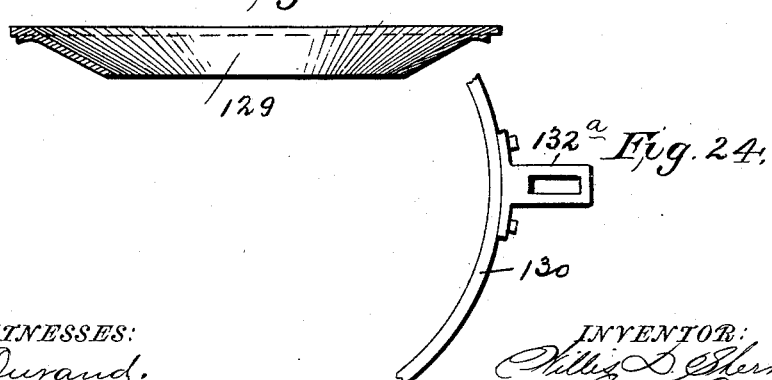
WITNESSES:
F. L. Ourand.
W. L. Coombs
INVENTOR:
Willis D. Sherman,
by James Bagger & Co.,
Attorneys

United States Patent Office.

WILLIS D. SHERMAN, OF OMAHA, NEBRASKA, ASSIGNOR TO THE UNION HYDRAULIC DRAIN TILE COMPANY, OF SAME PLACE.

SEWER-PIPE MACHINE.

SPECIFICATION forming part of Letters Patent No. 462,087, dated October 27, 1891.

Application filed December 11, 1890. Serial No. 374,356. (No model.)

*To all whom it may concern:*

Be it known that I, WILLIS D. SHERMAN, a citizen of the United States, and a resident of Omaha, in the county of Douglas and State of Nebraska, have invented certain new and useful Improvements in Sewer-Pipe and Drain-Tile Machines; and I do hereby declare that the following is a full, clear, and exact description of the invention, which will enable others skilled in the art to which it appertains to make and use the same, reference being had to the accompanying drawings, which form a part of this specification.

My invention relates to improvements in sewer-pipe and drain-tile machines of that class in which the pipe or tile are made of concrete, cement, or other material formed in molds carried by a revolving table and tamped or compacted by means of tamping-bars, which are secured to a frame which is movable vertically above the table, and, further, in which the mold-core is contractible and is suspended above the table, and is also movable vertically.

In Letters Patent granted to me September 3, 1889, No. 410,455, I have shown and described a machine of the above description. This machine, while performing the work for which it was designed in a very efficient manner, is capable only of forming round or circular sewer-pipe or drain-tile. The sewer-pipe or drain-tile, however, which is now coming into general use is of an oval or egg shaped form, and it is very desirable that a machine should be provided which would form this style or shape of tile or pipe.

The object of the present invention is to provide a machine which is capable of manufacturing egg-shaped or oval sewer-pipe or drain-tile, as well as circular or round; and it consists in the novel construction and combination of parts hereinafter fully described, and specifically pointed out in the claims.

Figure 2:
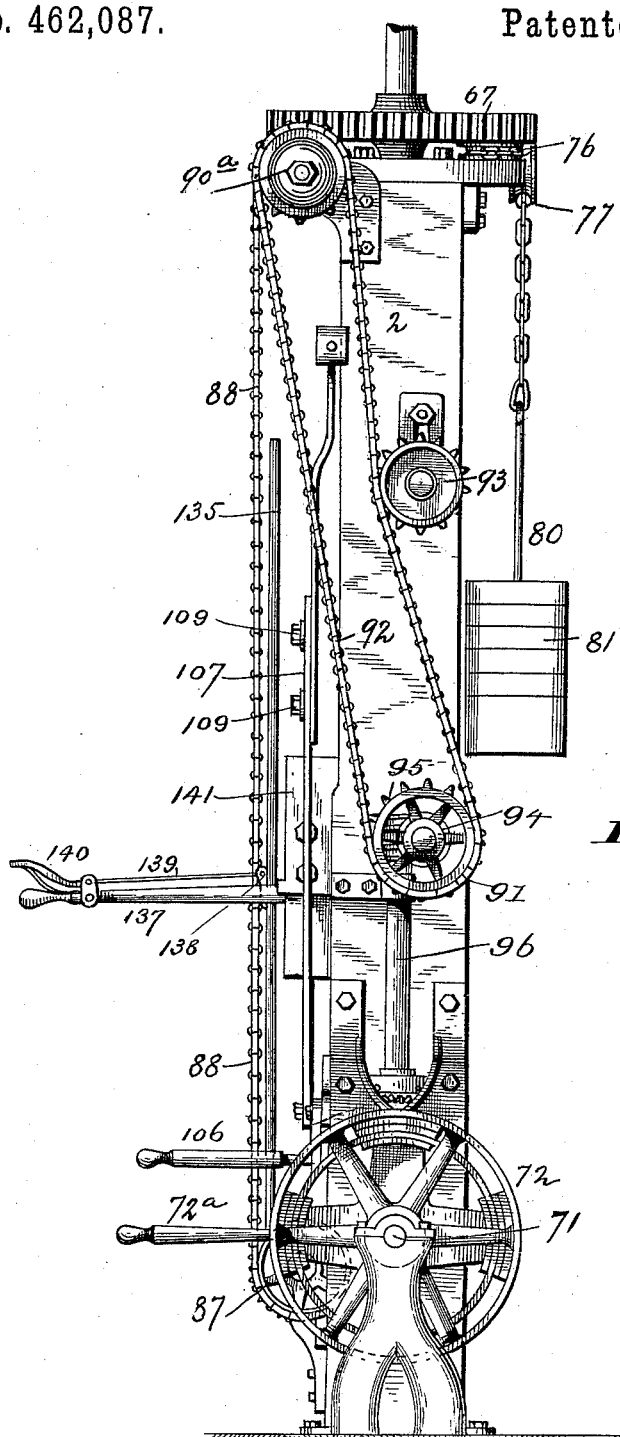
Figure 3:
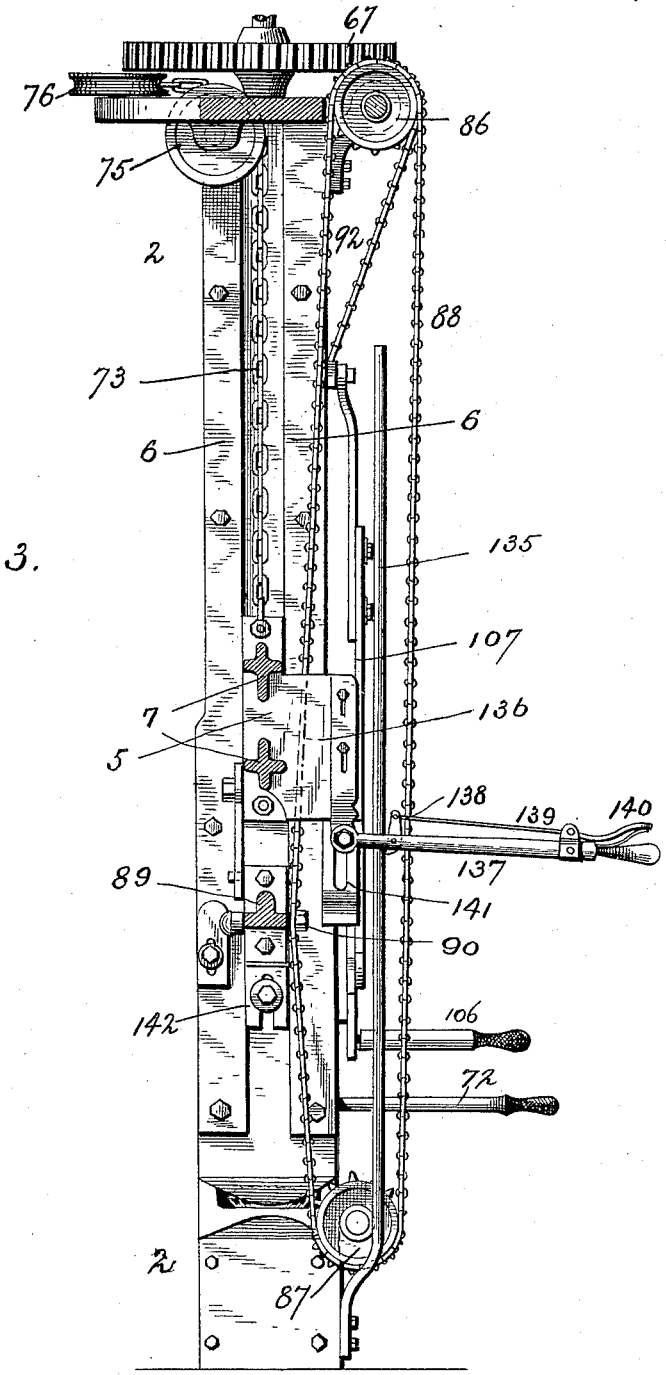
Figure 4:
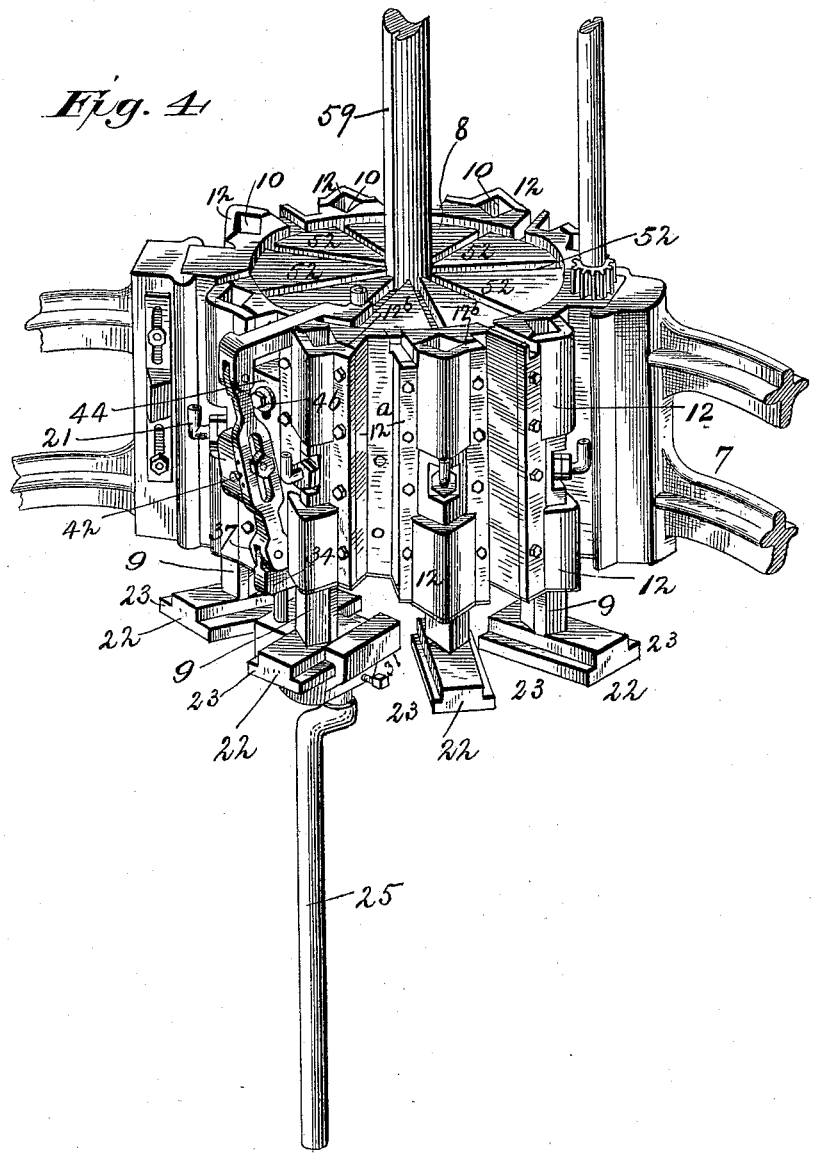
Figure 5:
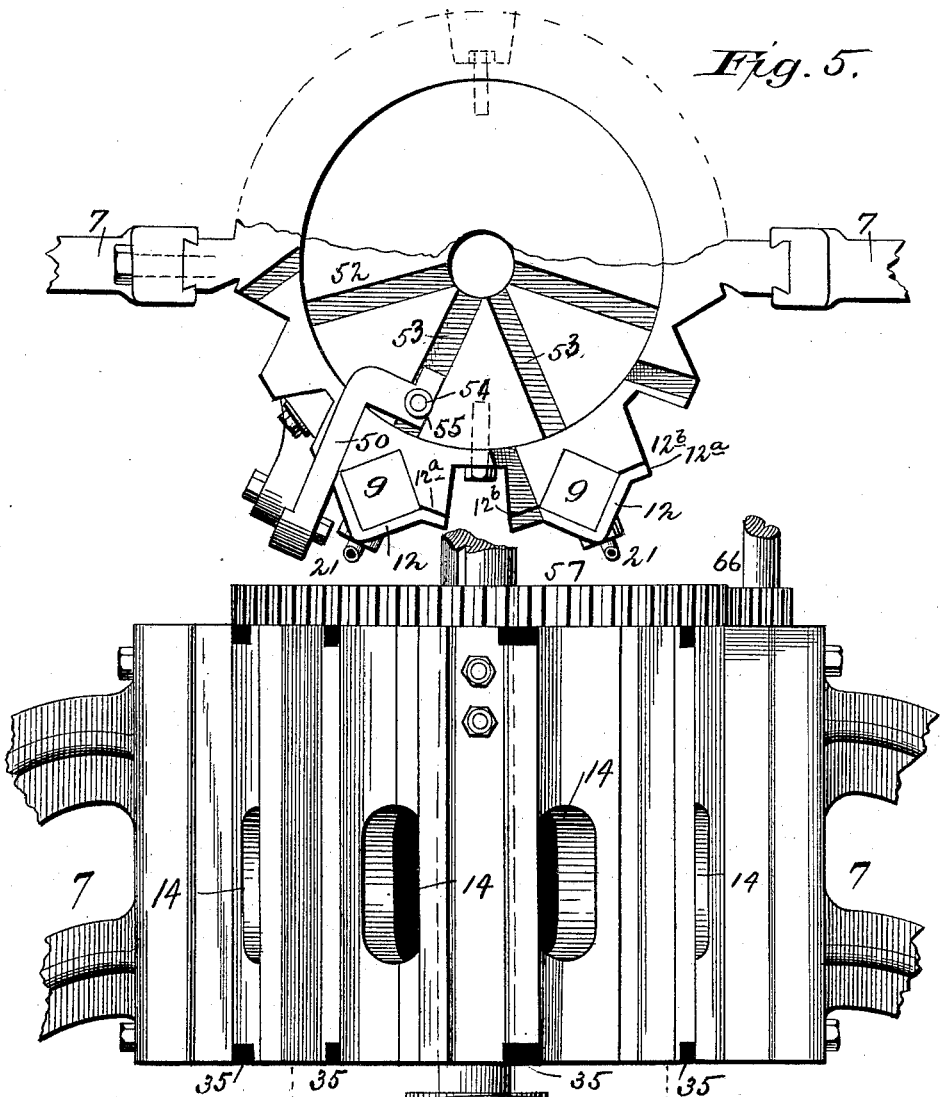
Figure 6:
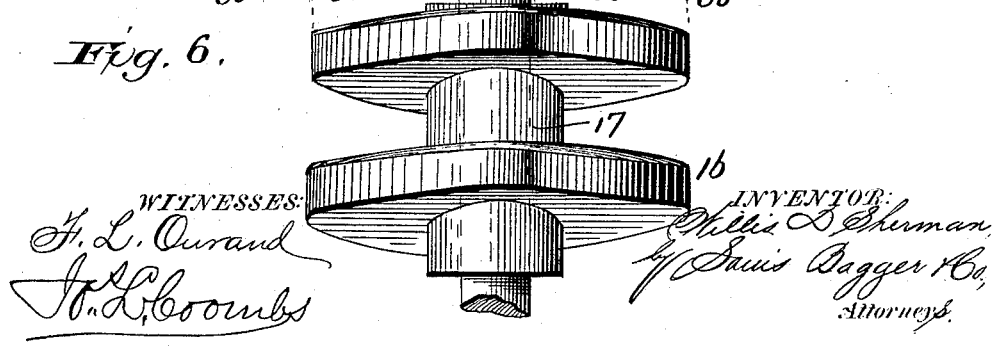
Figure 17:
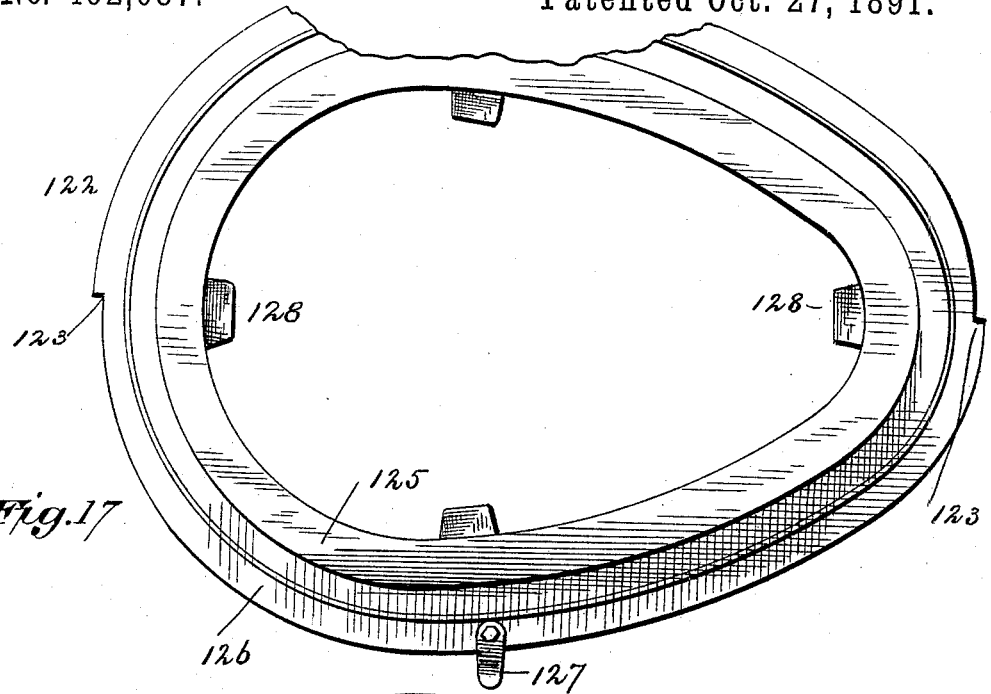
Figure 18:
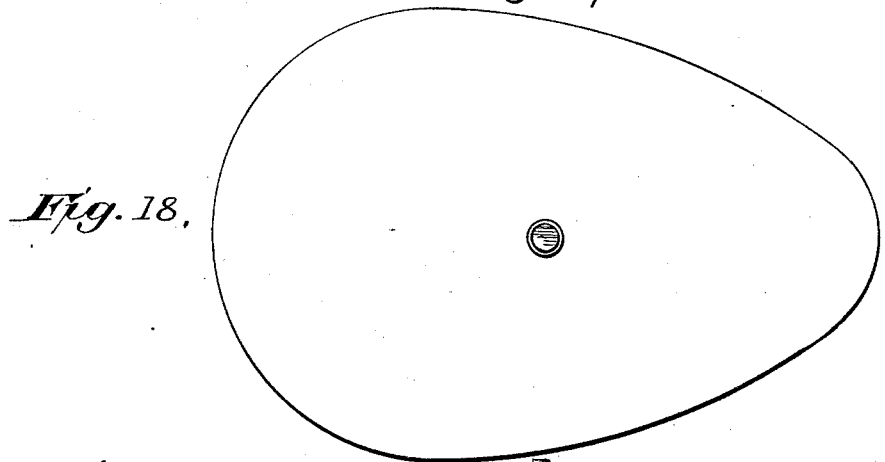
Figure 19:
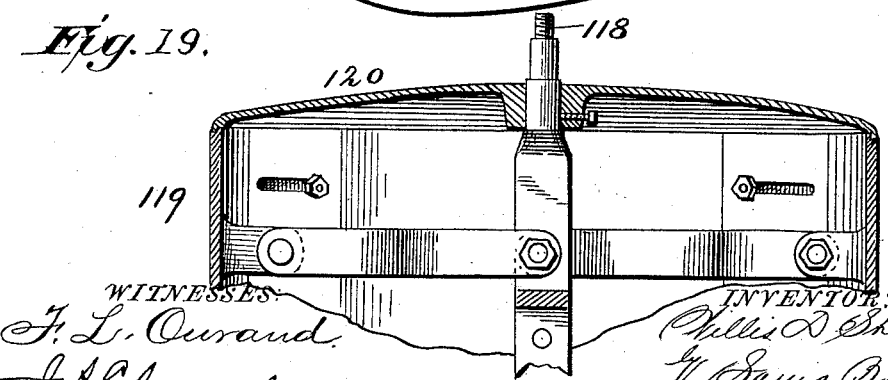

In the accompanying drawings, Figure 1 is a front elevation of a sewer-pipe or drain-tile machine constructed in accordance with my invention, the mold being shown in section. Fig. 2 is a side elevation of the same. Fig. 3 is a section on the line $x\,x$, Fig. 1. Fig. 4 is a perspective view of the head carrying the vertically-reciprocating bars by which the tamping-bars are actuated. Fig. 5 is a detail plan view of the same. Fig. 6 is an elevation of the same with the vertically-reciprocating bars and tamping-bars removed, also showing the cams for actuating said bars. Fig. 7 is a sectional elevation of the head carrying the tamping-bars looking from the rear, also showing a portion of the mold and the hooks pivoted to the frame of the head. Fig. 8 is an elevation of the devices for radially reciprocating the tamping-bars. Fig. 9 is a perspective view of the same. Fig. 10 is a perspective view of one of the shoes carrying the tamping-bars. Fig. 11 is a similar view of one of the tamping-bars. Fig. 12 is a perspective view of one of the adjustable lugs carrying a roller for disconnecting the hooks on the frame of the head from the cross-head to which the mold-core is suspended. Fig. 13 is a detail sectional view of the head, showing the manner of lubricating cams and rollers which operate the vertically-reciprocating bars. Fig. 14 is a plan view of one of said bars. Fig. 15 is an elevation of the same. Fig. 16 is a bottom view of the cam-wheel for radially reciprocating the tamping-bars. Fig. 17 is a plan view of the bottom plate carried by the revolving table and supporting the mold. Fig. 18 is a plan view of the mold-core cover. Fig. 19 is a sectional view of the upper portion of the contractible mold-core. Fig. 20 is a plan view of the hopper for the mold. Fig. 21 is a sectional view of the same on the line $x\,x$, Fig. 20, showing how it is supported by the cross-head carrying the mold-core. Fig. 22 is a side elevation of the hopper. Fig. 23 is a sectional view of the same on the line $y\,y$, Fig. 20. Fig. 24 is a detail plan view.

In the said drawings, the reference-numeral 1 designates the base of the machine, to which are bolted or otherwise secured the lower ends of two columns or supports 2 2, said columns being preferably hollow and provided at their lower ends with flanges, by which they can be better secured to the base. A table is pivotally secured to the base centrally between the columns, so that the sewer-pipe or drain-tile, as it is being formed within the shell of the mold upon the table, may be revolved or rotated under the ends of the tamping-bars of the tamping mechanism above the table. To prevent the accumulation of concrete, cement, or other filling material upon the base and table during the operation of the machine, they are cut away in any suitable manner to permit the material to pass through them, but not in such a way as to interfere with the formation of the pipe or drain-tile.

The tamping mechanism, which moves up and down in the guides 6 6, Fig. 3, upon the inner sides of the faces of the columns 2 2, consists of a frame composed of the vertically-movable slides 5 and two yokes 7 7, Figs. 1 and 3, within the latter of which the head 8 is suspended, and which carries a series of vertically-reciprocating bars 9, Figs. 4, 13, 14, and 15. In the present instance eight of these bars are shown; but it is obvious that more or less may be employed. These bars 9 are of metal and are square in cross-section. They fit in the angular or V-shaped ways 10, Figs. 10 and 4, in said head or cylinder, and are confined or held in place by the similarly-shaped caps 12, having flanges $12^a$ and interposed packing-strips $12^b$, bolted to said head or cylinder, Figs. 4 and 5. Midway of their height these caps are cut away or recessed, and the bars 9 are transversely apertured for the passage of the studs 13, which also pass through vertical slots 14 in the head or cylinder and carry at their inner ends revolving cone-rollers 15, which engage with the cam-wheels 16, carried by the vertical revolving or rotating shaft 17, passing centrally through said head or cylinder, Fig. 13. The studs 13 are provided with enlargements 18, Fig. 13, which fit against the shoulders 19, formed by recessing the bars around the apertures where the studs pass therethrough. The outer sides of the bars are similarly recessed and the ends of the studs are screw-threaded to receive the binding-nuts 20, by which they are held in place. These studs are also perforated centrally and provided at their outer ends with short upwardly-bent tubes or pipes 21, which are screwed into the outer ends thereof, forming a lubricating device by which oil or other lubricant can be fed to the rollers and their actuating-cams 16. The lower ends of the bars 9 are provided with radially-extending plates 22, having horizontal flanges 23, which receive the radially-reciprocating shoes 24, which carry the tamping-bars 25, Figs. 4, 10, and 13. The shoes consist of metallic plates having upwardly and inwardly projecting flanges 26, forming a rectangular recess 27 to receive the plates 22 and flanges 23. The bottoms of these shoes are provided with bosses 29 and with circular apertures 28, said apertures receiving the upper ends 30 of the tamping-bars 25, which are secured by means of the set-screws 31, Figs. 4 and 10, passing through the bosses 29. One of the flanges 26 of each shoe 24 is provided with a circular aperture 32 to receive the lower end of the downwardly-projecting stud or pin 33, formed with or secured to the radial arms or bars 34, which extend inwardly through apertures 35, Fig. 6, in the lower edge of the head or cylinder 8, being confined or held in place by means of the bottom plate $8^a$, Fig. 13, secured to said head. (See Figs. 6, 9, 10, and 13.) The outer ends of these bars 34 are provided with upwardly-extending lugs 36, to which are pivoted the lower bifurcated ends 37 of the adjustable pivoted levers 38, Figs. 8 and 9. These levers are pivoted intermediate their ends to the outwardly-extending brackets 39 by means of pivot-pins 40, being provided with slots 41, by means of which said pivot-pins may be adjusted vertically, being held in place by means of pins 42, passing through apertures 43 into said pivots. (See Fig. 9.) The brackets 39 are formed with or secured to plates 44, provided with vertical slots 45, by which they are adjustably secured to the head or cylinder 8 by means of headed bolts 46. The object of making these levers and plates adjustable is to vary the throw of the shoes carrying the tamping-bars for making different sizes of pipe or drain-tile, as will hereinafter appear. The upper ends of the levers are provided with studs 47, which work in slots 48 in the downwardly-depending lugs 49, formed with the radial bars 50, which are provided with angular or bent ends 51, with downwardly-projecting portions 52, which work in radial slots or grooves 53 in the upper face of the head or cylinder 8. (See Figs. 5, 8, and 9.) Upon the upper sides the angular ends 51 of the bars 50 are provided with studs 54, which carry revolving rollers 55, which work in a cam-groove 56, Fig. 16, upon the under face of the cam-wheel 57, having cogs 58. The shape of this cam-groove is approximately that of an oval with the sides bent in, one side projecting inwardly somewhat more than the other. This wheel is mounted upon the shaft 17, which is provided with a vertical groove 59, in which works a feather in said wheel.

The cam-wheel and connections whereby the tamping-bars are given a radially-reciprocating motion are only employed in making egg-shaped pipe, the object being to compensate for the varying diameters of the pipe by successively increasing and decreasing the throw of the tamping-bars—for instance, whereby as the mold is revolved, bringing each point thereof under all the tamping-bars, the latter are gradually expanded to their utmost limit and then gradually contracted, this expansion and contraction causing said tamping-bars to follow the contour of the mold.

The shaft 17 passes upwardly through the upper cross bar or beam connecting the columns 2 2, and is provided with a cog-wheel 61 and pinion 62, meshing with the loose cog-wheels 63 and 64, carried by shaft 65, also passing through said cross-beam and having its lower end journaled in the head or cylinder 8 and provided with a pinion 66, meshing with the cam-wheel 57, Fig. 1. When it is desired to change the speed of cam-wheel 57, cog-wheel 61 and pinion 62, which are rigidly secured to each other, are loosened and cog-wheel 63 tightened, when said cam-wheel 57 will be rotated by shaft 65 and pinion 66. These cog-wheels and pinions are also provided with feathers engaging with grooves in the said shafts. Motion is imparted to the said gears and shafts by means of cog-wheels 67, mounted upon the upper end of vertical shaft 68, passing down through one of the columns 2 and provided near its lower end with a beveled gear 69, which meshes with a corresponding gear 70 on the main shaft 71, which carries a driving-pulley 72, connected with any suitable motor, Figs. 1 and 3. This pulley is provided with an ordinary friction-clutch and an operating-lever 72ª, by actuating which said main shaft may be revolved.

To the yokes 7, connected with the vertically-movable plates 5, are secured chains 73 and 74, which respectively pass over sheaves 75, 76, 77, 78, and 79, Figs. 1, 2, and 3, and are connected with bars 80, which receive removable weights 81, which can be added to or taken from to regulate the density of the pipe, and which also serve to counterbalance the weight of the head or cylinder and connections.

The shaft 68 is journaled at its lower end in the base 1, and is provided with a spur-pinion 82, which engages with a cogged rim 83 upon the table and rotates the latter. (See Fig. 1.)

Journaled in bearings 84, in the upper ends of the columns 2, is a horizontal shaft 85, provided with sprocket-wheels 86, which are connected by means of sprocket-chains 88 with sprocket-wheels 87, journaled in the lower ends of the columns, Figs. 1, 2, and 3. These sprocket-chains are secured to the vertically-movable cross-head 89 by means of screw-bolts 90, said cross-head working in the guides 6 on the inner sides of the columns 2. One end of the shaft 85 is provided with a sprocket-wheel 90ª, connected by means of the sprocket-chain 92 with sprocket-wheel 91, journaled in one of the columns, said chain also engaging with the vertically-adjustable tightening-wheel 93, and secured to sprocket-wheel 91 is a worm-wheel 94, which meshes with a worm 95 on the upper end of the vertical shaft 96. The lower end of this shaft is provided with a bevel-gear 97, adapted to engage with the bevel-wheels 98 and 99, which are loosely mounted upon a shaft 100, which is provided with a cog-wheel 101, meshing with a spur-wheel 102 on the main driving-shaft. A clutch-wheel 103 is secured upon the shaft 100 by means of a pin, so that it can be moved back and forth between the bevel-wheels 98 and 99.

Pivoted to one of the columns 2 is a bell-crank lever 105, having one of its ends slotted and passed down over the handle 106, pivoted in front of the clutch-wheel 103. This handle has its inner end bifurcated and provided with friction-rollers, which engage with a groove in the periphery of the wheel for moving it back and forth upon its shaft while the other end projects in front of the machine, where it can be grasped by the operator to raise or lower the core-mold and tamping mechanism, as shown in my aforesaid patent, No. 410,455. To the other arm of the lever 105, intermediate of its ends, is pivotally connected the lower end of a two-part rod 107. The parts comprising this rod at their inner ends are provided with slots 108, through which pass headed bolts 109, by which they are adjustably connected. The upper end of this rod is pivotally connected with a lever 110, pivoted to the column and provided with a weight-extension 112.

Connected with the frame which carries the head or cylinder 8 are two spring-actuated pawls 113, pivoted to the sides of the yoke 7 7 and having pivoted ends 114, adapted to engage with pins or studs 115 on the cross-head 89. The object of these devices is to connect the cross-head carrying the mold-core 119 with the head or cylinder, so that when it is desired to lower the core into the mold the head or cylinder will also be lowered, as will hereinafter appear. The pawls are disengaged from the studs by means of the rollers 116, journaled in plates 117, secured to the columns which strike the beveled lower ends of the pawls in their downward movement and force them outward.

The mold-core and shell may be of any suitable construction, although I prefer to employ the form disclosed in concurrent applications filed by me, Serial Nos. 374,358 and 374,359. The core shown in said application No. 374,358 is collapsible or contractible, so that it may be readily withdrawn from the mold and a sectional view of the upper portion of the same is shown in Fig. 19, where the numeral 118 designates a central bar which is secured to the cross-head 89 by swivel-joint.

The numeral 119 denotes the sections or sides of the core, and 120 the cover.

The shell designated by the numeral 121 is shown in Fig. 1, and both it and the core are egg-shaped or oval. This shell rests on an egg-shaped bottom plate 122, (see Figs. 1 and 17,) which has its periphery cut away at two opposite points, forming shoulders 123, which engage with studs 124, Fig. 1, on the revolving table, so as to be rotated thereby. This plate is provided with an upwardly-projecting portion 125 and a peripheral flange 126, the latter being provided with pivoted clamps 127, which are adapted to be turned over and engaged with lugs secured to or formed on the lower edge of the shell. The portion 125 is provided with a number of inwardly-extending projections 128, which support the core.

In Figs. 20, 21, 22, and 23 I have illustrated views of the hopper which I prefer to use in connection with my invention. This hopper consists of an annular flaring-plate 129, having an oval or egg-shaped aperture in the bottom thereof corresponding in shape and size with the shell of the mold-core. This hopper is provided with an annular flange 130, which engages with lugs 131, connected with the lower side of the cross-head 89, by means of the plates 132ª, secured to said cross-head, Figs. 1, 21, and 22. The flange 130 is embraced between the lower side of the cross-head and the lugs 131, so as to be capable of a rotary movement, the plate 129 being provided with lugs 132, which engage with lugs 134 on the upper edge of the shell 121. As this shell revolves, the lugs thereon, engaging with the lugs 132, will rotate the said hopper.

It sometimes happens that the machine becomes overfed and thereby liable to clog. This might cause serious damage or injury unless some means were provided for slightly raising the head or cylinder. This I accomplish as follows: Secured to the lower part of one of the columns 2 is a vertical bar 135, which projects upwardly in front of the machine. Pivoted to the forwardly-projecting portion 136 of one of the yokes 7 is a lever 137, to which is pivoted a pawl 138, the upper end of which is connected by a rod 139 with a spring-actuated handle 140, pivoted in the outer end of the lever 137. By depressing this handle 140 the lower end of the pawl is caused to bite upon the rod or bar 135, forming a fulcrum for lever 137, by depressing which the head or cylinder will be slightly elevated and the tamping-bars raised out of contact with the filling material. As fresh material is fed in the mold the pawl of the lever is released and the operation of tamping proceeded with. This lever is located alongside of the bar 135, so that the pawl will be in line therewith. Additional pressure can also be given to the head or cylinder by depressing lever 137, which causes the head or cylinder to be forced down. In this latter case the lever 137 acts simply as a depressing-bar, and it is only when the pawl is made to bite upon the rod or bar 135 that it acts as a lever, said pawl then serving as the fulcrum. The yoke 7 is also provided with an adjustable stop 141, Fig. 1, which strikes the levers 105 and 110 to stop the movement of the cross-head carrying the core, and an adjustable stop 142 is secured to one of the uprights to limit the downward movement of said cross-head, Figs. 1 and 3.

The operation is as follows: The mold being placed in proper position on the rotating table, with the shoulders of the bottom plate engaging with the lug thereof, the lever 106 is shifted so as to lower the cross-head 89 and core-mold and tamping mechanism into position, when the machine is started by shifting friction-clutch lever 72ª, rotating the said table and mold. The shaft is revolved through the medium of the gears and shaft connected with the driving-shaft, causing the cams fixed therein to be also revolved, which in turn actuate the bars by means of the studs and rollers, causing them to be vertically reciprocated and at the same time working the tamping-bars, with which they are connected, up and down to compact the concrete or other material which is being gradually introduced into the mold. During this vertical reciprocation of the tamping-bars they are also radially contracted and expanded to conform to the line of travel of the mold, which, owing to its oval form, presents at each revolution varying diameters to the successive tamping-bars. As the work progresses the concrete or other filling material fed to the mold gradually raises the head or cylinder and the tamping-bars until the pipe or tile is completed. The operator now, by means of the lever 106, shifts the clutch 103 so as to engage with one of the bevel gear-wheels, which will actuate the sprocket-wheels, causing the chain to be set in motion. This will raise the cross-head 89 until it comes in contact with the slides of the frame of the head or cylinder, slightly raising the same so as to have the tamping-bars clear the mold. The adjustable stop 142 on the yoke 7 will then strike the lever 110, actuating bar 107, which in turn will actuate the lever 105, throwing the clutch out of gear with said bevel-wheel and causing the upward movement of the cross-head to cease. At the moment the cross-head strikes the head or cylinder frame the hooks on the latter will engage with the studs on said cross-head 89 and cause the same to be connected with the head or cylinder. The hopper and mold-core being connected with the cross-head 89, will rise with the same in its upward movement, so that the shell, the bottom plate, and the completed sewer-pipe or drain-tile can be removed and carried away and the shell and bottom plate be subsequently removed. During the operation of tamping the hopper revolves with the mold, and owing to the peculiar formation of the aperture in the bottom thereof the concrete or other material is always properly fed to the mold. The head or cylinder and the cross-head with the core and hopper are now suspended above the rotating table, so that the shell and bottom plate can again be placed upon the table. When this is done, the lever 106 is shifted in the opposite direction to that before stated, so as to engage with bevel-gear, causing the sprocket-chain 92 to be actuated in a reverse direction. This will lower the cross-head, and by means of the hooks and lugs the head and cylinder will also be lowered until the adjustable stop 142 strikes the lever 105 and throws the clutch and bevel-gear out of mesh, when the downward movement will cause the core being properly inserted in the shell with the tamping-bar ready for action. At the same time the beveled ends of the hooks 113 will strike the rollers 116, which will disengage them from the pins 115, so that the head or cylinder can again rise by the accumulation of the concrete, as before set forth. The stop also acts to limit the downward movement of the cross-head, as, if no provision were made therefor, the weight of the cross-head and connections would cause it to fall too far when the sprocket-chain and its connections were thrown out of gear. By removing the levers 38 circular or round pipe can be produced, as the tamping-bars will then have no radial movement. By changing the fulcrum of the lever 38, by means of the pivot-pins 40 and securing-pins 43, and having different offsets on the tampers, the throw of the levers will be correspondingly changed, so that they can thus be made to produce pipe or drain-tiles of different diameters, it being obvious that by thus changing the fulcrum of said levers by moving the pivot-pins up or down the radial stroke of the tamping-bars will be lengthened or shortened, according to the adjustment of said levers.

Having thus described my invention, what I claim is—

1. In a sewer-pipe and drain-tile machine, the combination, with a vertically-movable head or cylinder, a central shaft having cams thereon, and vertically-reciprocating bars engaging with said cams, of the tamping-bars movably connected with said vertically-movable bars, and means, substantially as described, for radially reciprocating said tamping-bars.

2. In a sewer-pipe and drain-tile machine, the combination, with a vertically-movable head or cylinder, a central shaft having cams thereon, vertically-reciprocating bars having inwardly-projecting studs engaging with said cams, of the tamping-bars connected with said vertically-movable bars, and means, substantially as described, for radially reciprocating said tamping-bars, substantially as described.

3. In a sewer-pipe and drain-tile machine, the combination, with a vertically-movable head or cylinder, a central shaft passing therethrough and provided with cams, and vertically-reciprocating bars having studs engaging with said cams and provided at their lower ends with radially-extending plates, of the tamping-bars having shoes working on said plates, and means, substantially as described, for radially reciprocating said tamping-bars, substantially as described.

4. In a sewer-pipe and drain-tile machine, the combination, with a vertically-movable head or cylinder, a central shaft passing therethrough and provided with cams, and vertically-reciprocating bars having studs provided with rollers engaging with said cams and provided at their lower ends with radially-extending plates, of the tamping-bars having shoes working on said plates, the pivoted adjustable levers connected with said shoes at their lower ends and at their upper ends connected with radially-reciprocating bars, and means for actuating said bars, substantially as described.

5. In a sewer-pipe and drain-tile machine, the combination, with a vertically-movable head or cylinder, a central shaft passing therethrough and provided with cams, and vertically-reciprocating bars having studs provided with rollers engaging with said cams and provided at their lower ends with radially-extending plates, of shoes working on said plate carrying tamping-bars, the radially-reciprocating plate connected with said shoes, the pivoted levers connected at their inner ends with said shoes and at their upper ends connected with radially-extending plates, and a cam-wheel carried by the central shaft, having a cam-groove engaging said plates to radially reciprocate said plates and the tamping-bars, substantially as described.

6. In a sewer-pipe and drain-tile machine, the combination, with a vertically-movable head or cylinder, a central shaft passing therethrough provided with cams and with a wheel having a cam-groove, and the vertically-reciprocating bars having studs provided with rollers engaging with said arms and provided at their lower ends with radially-extending plates, of the shoes working on said plates, having apertures to receive tamping-bars and apertures to receive pivots on radially-extending bars, the tamping-bars, the radially-extending-plates having studs fitting in the apertures in the shoes and upwardly-extending lugs, the levers pivoted in brackets secured to the head or cylinder, connected at their lower ends with said studs, the radially-extending bars connected with the upper ends of said levers, and the studs or rollers on said bars working in the grooves of the cam-wheel, substantially as described.

7. In a sewer-pipe and drain-tile machine, the combination, with a vertically-movable head or cylinder having a series of radial grooves, a central shaft passing therethrough provided with cams, a wheel having a cam-groove, and the vertically-reciprocating bars having studs, provided with rollers engaging with said cams and provided at their lower ends with radially-extending plates, of the shoes having apertures therein and with upwardly and inwardly extending flanges, the tamping-bars connected with said shoes, the radial bars having downwardly-extending studs working in apertures in said shoes and with upwardly-extending lugs, the slotted levers pivoted in slotted brackets secured to said head or cylinder and provided at their upper ends with lugs, the radial bars working in the grooves in the head or cylinder, slotted at their outer ends to engage with said lugs and provided at their inner ends with studs or rollers engaging with the groove in the cam-wheel, substantially as described.

8. In a sewer-pipe and drain-tile machine, the combination of the vertically-movable head or cylinder having a series of vertical V-shaped grooves upon its periphery, the caps having V-shaped grooves, central recesses, and flanges by which they are secured to said head, the interposed packing-strips between said caps and head, the vertically-reciprocating bars having radial apertures, the studs passing through said apertures with a central bore and provided at their inner ends with rollers, and the short upwardly-curved pipes projecting through the recesses in said caps, substantially as described.

9. In a sewer-pipe and drain-tile machine, the combination of the head or cylinder having a series of vertically-reciprocating bars having radial apertures, studs passing through said apertures with a central bore and provided at their inner ends with rollers, and the short upwardly-curved pipes connected with said studs, substantially as described.

10. In a sewer-pipe and drain-tile machine, the combination, with a vertically-movable head or cylinder with a central shaft passing therethrough, and a frame connected with said head or cylinder, having slides working in grooves in the uprights of the machine and provided with pivoted hooks, of the cross-head working in the ways in said uprights and having studs adapted to engage with said hooks, and adjustable rollers secured to said uprights, substantially as described.

11. In a sewer-pipe and drain-tile machine, the combination, with the uprights with a vertically-movable head or cylinder with central shaft passing therethrough having spring-actuated pivoted hooks, of the cross-head working in ways in said uprights and having studs adapted to engage with said hooks, the rollers pivoted to plates adjustably secured to said uprights, and the adjustable stops to limit the downward movement of said cross-head, substantially as described.

12. The hopper consisting of an annular flaring rim having an oval or egg-shaped aperture in the bottom, substantially as described.

13. In a sewer-pipe and drain-tile machine, the combination, with the uprights and the rotatable table for supporting a mold, of the cross-head adapted to raise the core of said mold and having downwardly-projecting lugs on its under side, and the annular flaring hopper having an oval or egg-shaped bottom and a peripheral flange upon its top or upper edge, substantially as described.

14. In a sewer-pipe and drain-tile machine, the combination, with the uprights and a rotatable table for supporting a mold, having lugs upon the shell, of the vertically-movable cross-head adapted to elevate the core-mold, having downwardly-projecting lugs on the under side, the annular flaring hopper having oval or egg-shaped bottom, a peripheral flange upon its top or upper edge, and lugs adapted to engage with the lugs on the mold-shell, substantially as described.

15. In a sewer-pipe and drain-tile machine, the combination, with a vertically-movable head or cylinder and the rotatable table having lugs thereon, of the mold having a bottom plate with peripheral shoulders adapted to engage with said lugs, substantially as described.

16. In a sewer-pipe and drain-tile machine, the combination, with a vertically-movable head or cylinder and a rotatable table having lugs thereon, of the mold having a bottom plate with peripheral shoulders, pivoted clamps for holding the mold-shell, and inwardly-extending projections to support the mold-core, substantially as described.

17. In a sewer-pipe and drain-tile machine, the combination, with the uprights, the vertically-movable cross-head having a pivoted lever provided with a pawl, and means, substantially as described, for actuating the same, of a vertical bar secured to one of the uprights with which said pawl is adapted to engage, substantially as set forth.

18. In a sewer-pipe and drain-tile machine, the combination of the uprights and the vertically-movable head or cylinder, the central shaft having cams, and a cam-wheel with cam-groove, the vertically-reciprocating bars, the vertically and radially reciprocating tamping-bars, and means, substantially as described, for connecting them with the cam-wheel, the vertically-movable cross-head, the oval or egg-shaped mold, and the rotatable table supporting and carrying said mold, substantially as described.

19. The cam-wheel having a cam-groove approximately oval in shape with inwardly-projecting curved sides, in combination with the vertically-movable head or cylinder and central shaft and the vertically and radially reciprocating tamping-bars and connections, substantially as described.

In testimony that I claim the foregoing as my own I have hereunto affixed my signature in presence of two witnesses.

WILLIS D. SHERMAN.

Witnesses:
JOS. L. COOMBS,
BENNETT S. JONES.